(12) United States Patent
Bevilacqua et al.

(10) Patent No.: US 11,267,589 B2
(45) Date of Patent: Mar. 8, 2022

(54) DRAG-BASED PROPELLANT-LESS SMALL SATELLITE ATTITUDE ORBIT AND DE-ORBIT CONTROL SYSTEM

(71) Applicants: University of Florida Research Foundation, Incorporated, Gainesville, FL (US); United States Government Administrator of NASA, Washington, DC (US)

(72) Inventors: Riccardo Bevilacqua, Gainesville, FL (US); David C. Guglielmo, Gainesville, FL (US); Sanny Omar, Gainesville, FL (US); Laurence Fineberg, Kennedy Space Center, FL (US); Justin Treptow, Kennedy Space Center, FL (US); Scott Clark, Kennedy Space Center, FL (US); Yusef Johnson, Kennedy Space Center, FL (US); Bradley Poffenberger, Kennedy Space Center, FL (US)

(73) Assignees: University of Florida Research Foundation, Incorporated, Gainesville, FL (US); United States of America as Represented by the Administrator of NASA, Washington, DC (US)

( * ) Notice: Subject to any disclaimer, the term of this patent is extended or adjusted under 35 U.S.C. 154(b) by 192 days.

(21) Appl. No.: 16/324,396

(22) PCT Filed: Nov. 14, 2017

(86) PCT No.: PCT/US2017/061498
§ 371 (c)(1),
(2) Date: Feb. 8, 2019

(87) PCT Pub. No.: WO2018/093761
PCT Pub. Date: May 24, 2018

(65) Prior Publication Data
US 2020/0189769 A1    Jun. 18, 2020

Related U.S. Application Data

(60) Provisional application No. 62/422,761, filed on Nov. 16, 2016.

(51) Int. Cl.
*B64G 1/22*    (2006.01)
*B64G 1/24*    (2006.01)
(Continued)

(52) U.S. Cl.
CPC ............. *B64G 1/222* (2013.01); *B64G 1/242* (2013.01); *B64G 1/244* (2019.05); *B64G 1/32* (2013.01);
(Continued)

(58) Field of Classification Search
CPC ........ B64G 1/222; B64G 1/244; B64G 1/242; B64G 1/24; B64G 2001/245; B64G 1/32; B64G 1/366; B64G 1/62; B64G 1/66
See application file for complete search history.

(56) References Cited

U.S. PATENT DOCUMENTS 5,857,648 A * 1/1999 Dailey .................. B64G 1/222
                                                    244/172.6
9,004,410 B1    4/2015 Steele et al.
(Continued)

OTHER PUBLICATIONS

International Searching Authority, International Search Report for International Application No. PCT/US2017/061498, dated Feb. 9, 2018, 4 pages, Korean Intellectual Property Office, Republic of Korea.
(Continued)

*Primary Examiner* — Joshua J Michener
*Assistant Examiner* — Cindi M Curry

(74) *Attorney, Agent, or Firm* — Alston & Bird LLP

(57) ABSTRACT

In an example embodiment, an attitude, orbit, and de-orbit control system (AODCS) for a satellite is provided. In an example embodiment, the AODCS system comprises one or more selectively retractable booms. The one or more selectively retractable booms are collectively configured to provide a selectively adjustable drag during de-orbiting of a satellite over a predefined de-orbiting time.

20 Claims, 13 Drawing Sheets

(51) Int. Cl.
| | | |
|---|---|---|
| *B64G 1/32* | (2006.01) | |
| *B64G 1/28* | (2006.01) | |
| *B64G 1/36* | (2006.01) | |
| *B64G 1/66* | (2006.01) | |

(52) U.S. Cl.
CPC ............... *B64G 1/285* (2013.01); *B64G 1/36* (2013.01); *B64G 1/66* (2013.01); *B64G 2001/245* (2013.01)

(56) References Cited

U.S. PATENT DOCUMENTS

| | | | |
|---|---|---|---|
| 2012/0097797 A1 | 4/2012 | Woo et al. | |
| 2014/0061386 A1* | 3/2014 | Peterka, III | B64G 1/641 |
| | | | 244/171.5 |
| 2014/0150863 A1* | 6/2014 | Spence | B64G 1/443 |
| | | | 136/256 |
| 2016/0137319 A1 | 5/2016 | Steele et al. | |
| 2016/0244189 A1* | 8/2016 | Turner | B64G 1/44 |
| 2016/0311558 A1* | 10/2016 | Turse | B64G 1/222 |
| 2019/0144138 A1* | 5/2019 | Spark | H02S 30/20 |
| | | | 244/172.6 |

OTHER PUBLICATIONS

Omar, Sanny, "Using Differential Aerodynamic Forces for CubeSat Orbit Control", 27th Annual AIAA/USU Conference on Small Satellites, SSC13-VIII-4, 2013, retrieved from <https://digitalcommons.usu.edu/cgi/viewcontent.cgi?article=2969& . . . > on Jan. 26, 2019, 12 pages.

Omar, Sanny, et al., "Re-Entry Point Targeting for LEO Spacecraft using Aerodynamic Drag", Aerospace Control and Guidance Systems Committee Meeting #118, Oct. 19-21, 2016, retrieved from <https://ntrs.nasa.gov/archive/nasa/casi.ntrs.nasa.gov/20160012488.pdf> on Jan. 26, 2019, 38 pages.

* cited by examiner

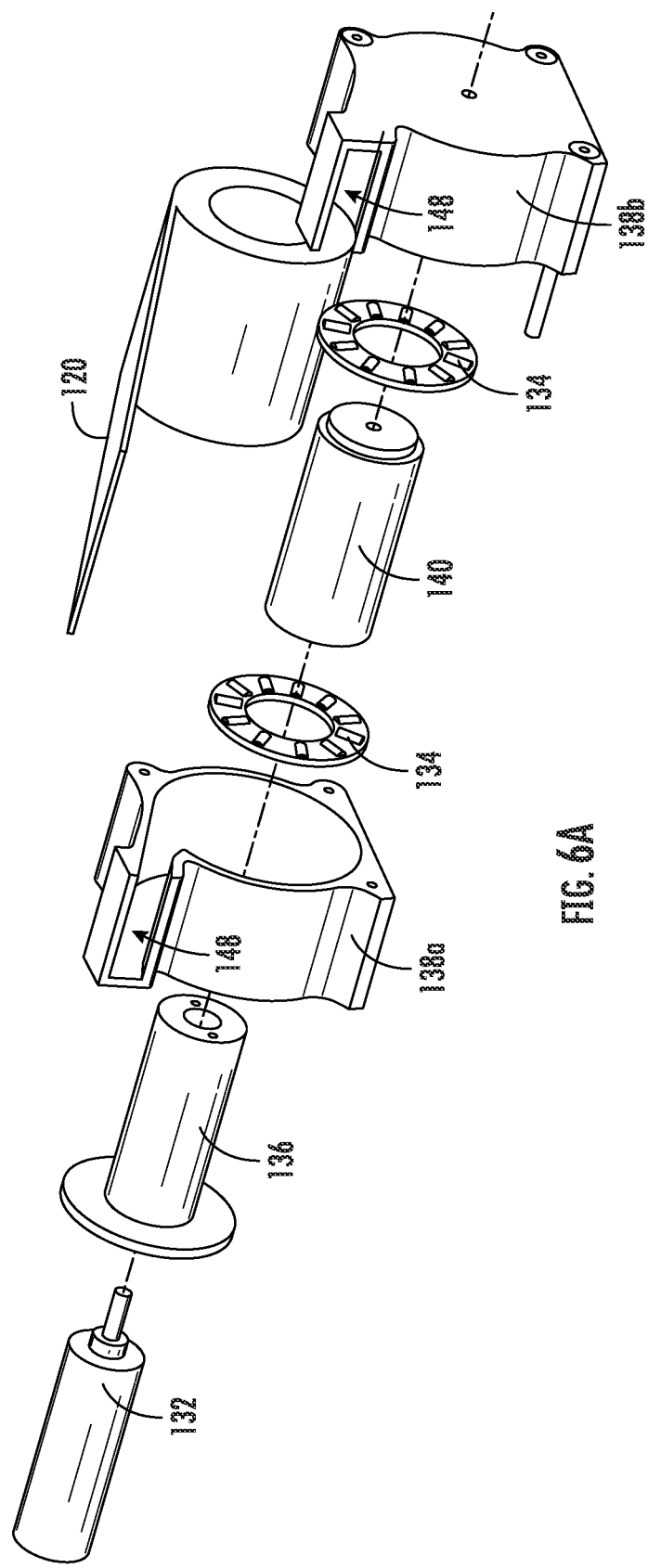

DRAG-BASED PROPELLANT-LESS SMALL SATELLITE ATTITUDE ORBIT AND DE-ORBIT CONTROL SYSTEM

CROSS REFERENCE TO RELATED APPLICATIONS

This application is a National Stage Application, filed under 35 U.S.C. 371, of International Application Serial No. PCT/US2017/061498, filed Nov. 14, 2017, which claims priority to U.S. Application Ser. No. 62/422,761, filed Nov. 16, 2016; the contents of both of which as are hereby incorporated by reference in their entireties.

FEDERALLY SPONSORED RESEARCH OR DEVELOPMENT

This invention was made with government support under contract number NNK12LA12C awarded by the National Aeronautics and Space Administration (NASA). The government has certain rights in the invention.

BACKGROUND

Related Field

Background

To minimize the amount of space debris and reduce the chance of collisions between satellites, satellites are required to de-orbit (e.g., fall out of orbit and re-enter the Earth's atmosphere) no later than 25 years after the satellite's launch. NASA Procedural Requirements for Limiting Orbital Debris, NPR 8715.6A, places limitations on the orbits into which satellites may be launched. In particular, most satellites need to be launched into a low Earth orbit to ensure that within 25 years they will de-orbit. As a result, low Earth orbit space is becoming more and more crowded. Thus, there is a need in the art for systems that would allow satellites to access higher orbits while still providing means for de-orbiting within 25 years.

BRIEF SUMMARY

Example embodiments of the present invention provide an attitude, orbit, and de-orbit control system (AODCS) for use on small satellites, such as CubeSats, or larger vehicles up to a few hundred pounds. In particular, the AODCS comprises one or more extendible and/or retractable booms that may be used to control the amount of drag experienced by the satellite. The one or more booms may be configured such that they collectively provide sufficient drag for de-orbiting a satellite over a predefined de-orbiting time.

According to an aspect of the present invention, an AODCS for a satellite is provided. In an example embodiment the AODCS comprises one or more selectively retractable booms, said one or more selectively retractable booms being collectively configured to provide a selectively adjustable drag during de-orbiting of a satellite over a predefined de-orbiting time.

In an example embodiment, the one or more selectively retractable booms comprise four selectively retractable booms. In an example embodiment, each of the one or more selectively retractable booms (a) are secured to a rear face of the satellite and (b) are inclined at an angle of 20° with respect to the rear face of the satellite. In an example embodiment, the angle between each of the booms and the direction of travel of the satellite is independently adjustable. In an example embodiment, each of the selectively retractable booms is independently extendable and retractable. In an example embodiment, the angle between each selectively retractable boom and a plane normal to the direction of travel of the satellite is 20°. In an example embodiment, a first deployer secures a first boom of the one or more selectively retractable booms to the satellite, a second deployer secures a second boom of the one or more selectively retractable booms to the satellite, a third deployer secures a third boom of the one or more selectively retractable booms to the satellite, and a fourth deployer secures a fourth boom of the one or more selectively retractable booms to the satellite, the second deployer is rotated 90 degrees with respect to the first deployer, the third deployer is rotated 180 degrees with respect to the first deployer, and the fourth deployer is rotated 270 degrees with respect to the first deployer. In an example embodiment, each selectively retractable boom is V-shaped in cross section. In an example embodiment, wherein each selectively retractable boom has a V-shaped cross section with a rounded base. In an example embodiment, each selectively retractable boom is shaped by three-point bending with a tip radius of 4 mm. In an example embodiment, each selectively retractable boom has a fully deployed length of 3.7 meters. In an example embodiment, each selectively retractable boom has a flat width of 4 cm. In an example embodiment, each selectively retractable boom is secured to a drum. In an example embodiment, the drum is secured to a motor. In an example embodiment, the drum is fitted over a shaft of the motor and held in place by at least one thrust bearing. In an example embodiment, the motor acts to retract or extend one of the booms.

In an example embodiment, the AODCS further comprises a system controller configured to control the motor. In an example embodiment, the system controller comprises at least one processor configured to generate one or more instructions for operation of the motor. In an example embodiment, the system controller is configured to cause one or more of the booms to be extended or retracted to control drag on the satellite. In an example embodiment, the one or more booms are configured to provide sufficient drag to de-orbit a 15 kg satellite from a 700 km circular Earth orbit in 25 years. In an example embodiment, the AODCS weighs less than 1.33 kg and fits within a 10×10×10 cm volume. In an example embodiment, the AODCS further comprises one or more magnetorquers. In an example embodiment, the one or more magnetorquers comprise five magnetorquers. In an example embodiment, four of the magnetorquers are disposed between adjacent deployers. In an example embodiment, one of the magnetorquers is disposed in a plane that is generally parallel to a back surface of the satellite body. In an example embodiment, the AODCS further comprises at least one magnetometer. In an example embodiment, the one or more magnetorquers are configured to adjust the angular momentum of the satellite so that the satellite may efficiently exit the tumbling state. In an example embodiment, the one or more booms are not extended until the satellite exits the tumbling state.

According to another aspect of the present invention, a satellite having an AODCS secured thereto is provided. The AODCS comprises one or more selectively retractable booms, said one or more selectively retractable booms being collectively configured to provide a selectively adjustable drag during de-orbiting of a satellite over a predefined de-orbiting time.

In an example embodiment, the AODCS further comprises one or more magnetorquers. In an example embodiment, the one or more selectively retractable booms comprises four selectively retractable booms and the one or more magnetorquers comprises five magnetorquers. In an example embodiment, the satellite is a CubeSat.

According to yet another aspect of the present invention, a computer-implemented method for controlling the attitude or orbit of a satellite comprising an AODCS is provided.

The AODCS comprises one or more selectively retractable booms and one or more magnetorquers, said one or more selectively retractable booms being collectively configured to provide a selectively adjustable drag during de-orbiting of a satellite over a predefined de-orbiting time. The method comprises the steps of storing a desired movement plan in one or more memory storage areas; receiving signals from at least one of one or more angular velocity sensors, one or more magnetometers, and/or one or more other sensors onboard the satellite; and executing one or more processors of a system controller to determine a current movement of the satellite based at least in part on the received signals; determine at least one of one or more boom adjustments or one or more magnetorquer adjustments needed to adjust the current movement of the satellite to align with the desired movement plan; and cause one or more booms to be extended and/or retracted based on the determined one or more boom adjustments and/or cause a current to flow within one or more magnetorquers based on the determined one or more magnetorquer adjustments.

In an example embodiment, the desired movement plan comprises a set of desired orbital position vectors and desired orbital velocity vectors over time, corresponding to the orbital decay associated with a specified drag profile. In an example embodiment, this drag profile corresponds to a decay trajectory where the satellite de-orbits in a desired location. In practice, the actual position and velocity vector may diverge from the desired position and velocity vector at a given time due to the inability to perfectly predict the aerodynamic drag force and other orbital perturbations acting on the satellite. In an example embodiment, the aerodynamic drag force can be adjusted by the AODCS based on the difference between the current movement and the desired movement plan to ensure that the satellite aligns with the desired movement plan. The current movement plan is considered aligned with the desired movement plan when the actual orbital position vector and actual velocity vector of the satellite are within a specified tolerance of the desired orbital position and desired velocity vectors specified by the desired movement plan at that point in time.

In an example embodiment, the AODCS will enable the spacecraft to perform attitude stabilization, by using, for example, aerodynamic and gravity gradient torques and attitude rate damping with magnetorquers. In various embodiments, an orbit-fixed reference frame is centered on the satellite with orbit-fixed x-axis aligned with the orbital velocity vector, orbit-fixed y-axis opposite the orbit angular momentum vector, and orbit-fixed z-axis completing the right-handed coordinate system. Consider also a spacecraft-fixed reference frame with spacecraft-fixed z-axis passing through the center of the AODCS and aligned with the long axis of the satellite 110 and spacecraft-fixed x and y axes perpendicular to the z-axis. Attitude stabilization occurs when the spacecraft-fixed reference frame maintains some predefined orientation or prescribed movement plan (within some predefined and/or configurable tolerance) with respect to the orbit-fixed reference frame. In an example embodiment, the spacecraft-fixed z-axis will be passively aligned with the orbit-fixed x-axis within a configurable angle. In an example embodiment, the configurable angle is 15 degrees.

According to still another aspect of the present invention, a computer program product for controlling the attitude or orbit of a satellite comprising an AODCS is provided. The AODCS comprises one or more selectively retractable booms and one or more magnetorquers, said one or more selectively retractable booms being collectively configured to provide a selectively adjustable drag during de-orbiting of a satellite over a predefined de-orbiting time. The computer program product comprising at least one non-transitory computer-readable storage medium having computer-executable program code instructions stored therein. The computer-executable program code instructions comprise program code instructions configured to: receive signals from at least one of one or more angular velocity sensors, one or more magnetometers, and/or one or more other sensors onboard a satellite; determine a current movement of the satellite based at least in part on the received signals; access a desired movement plan in one or more memory storage areas; determine at least one of one or more boom adjustments or one or more magnetorquer adjustments needed to adjust the current movement of the satellite to align with the desired movement plan; and cause one or more booms to be extended and/or retracted based on the determined one or more boom adjustments and/or cause a current to flow within one or more magnetorquers based on the determined one or more magnetorquer adjustments.

BRIEF DESCRIPTION OF THE FIGURES

Figure 1:
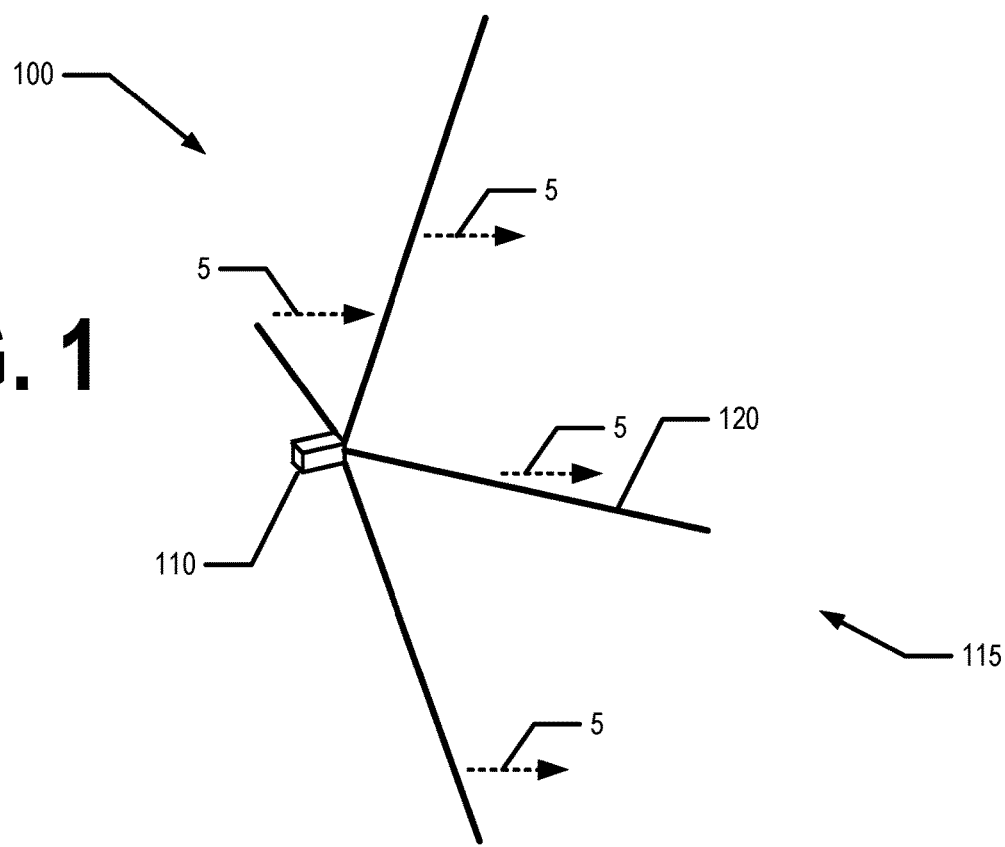
Figure 1A:
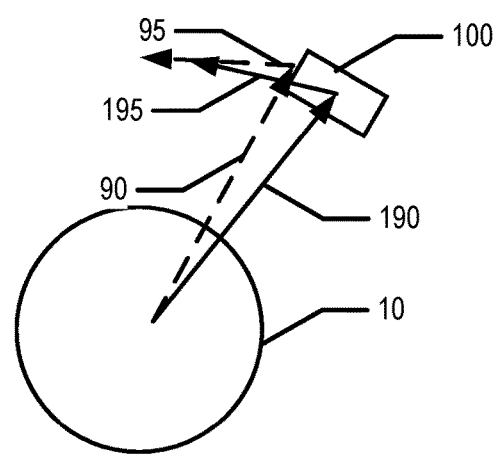
Figure 1B:
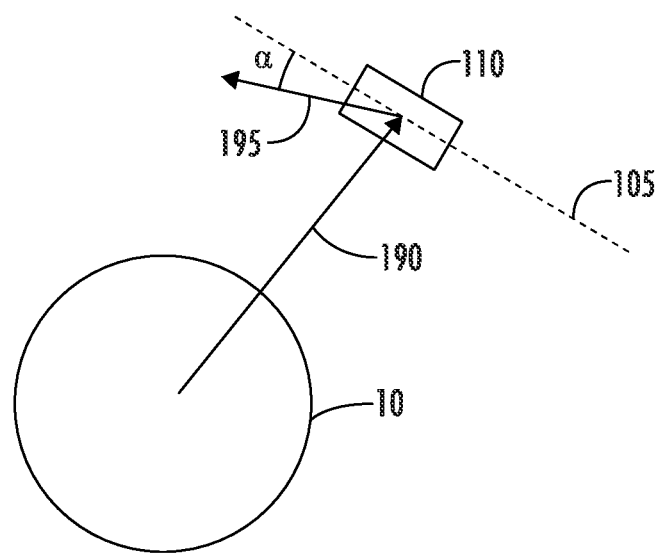
Figure 2:
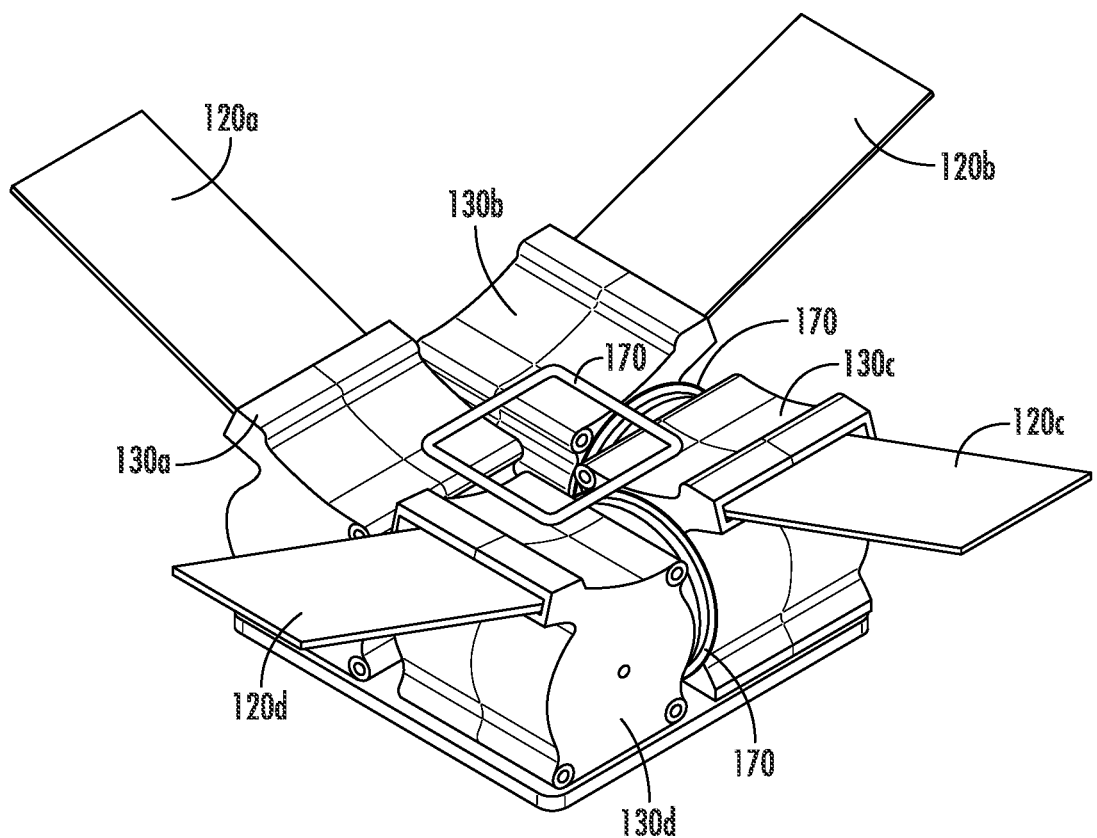
Figure 3A:
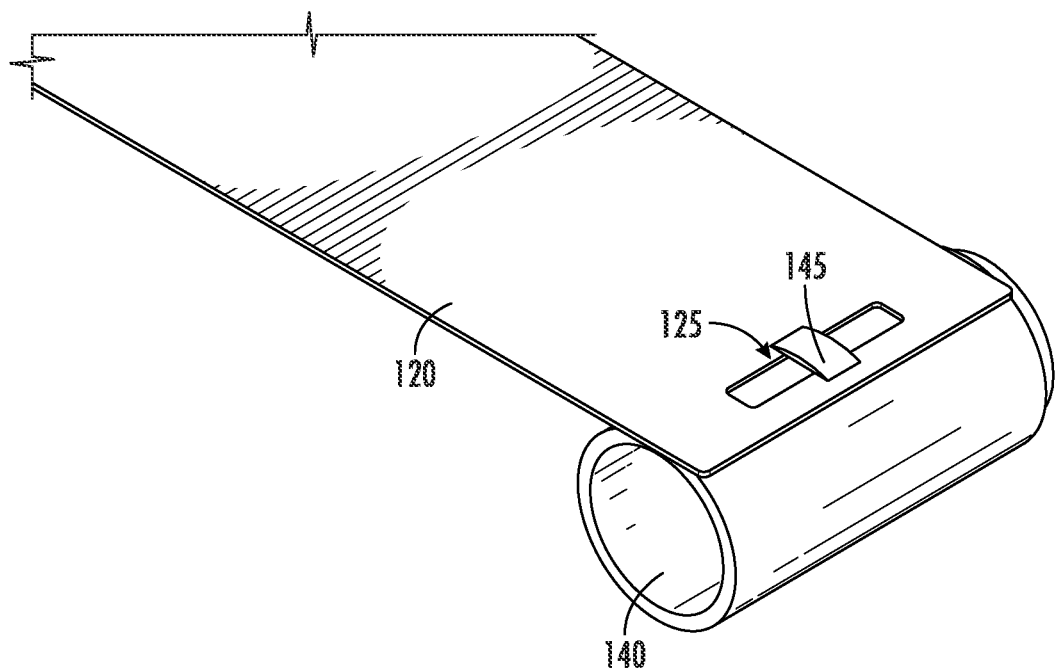
Figure 3B:
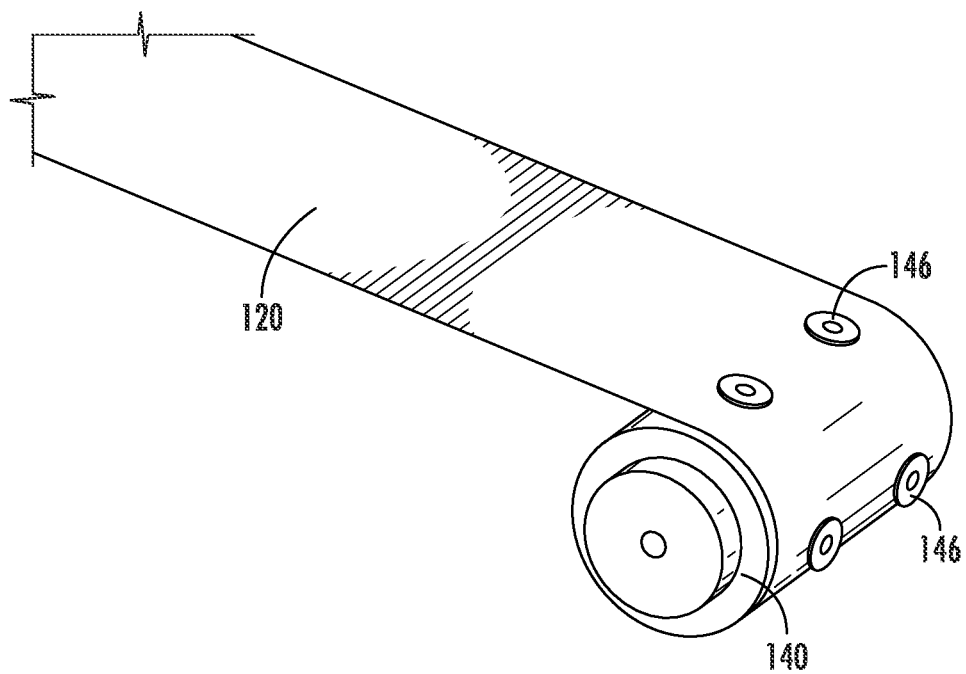
Figure 4A:
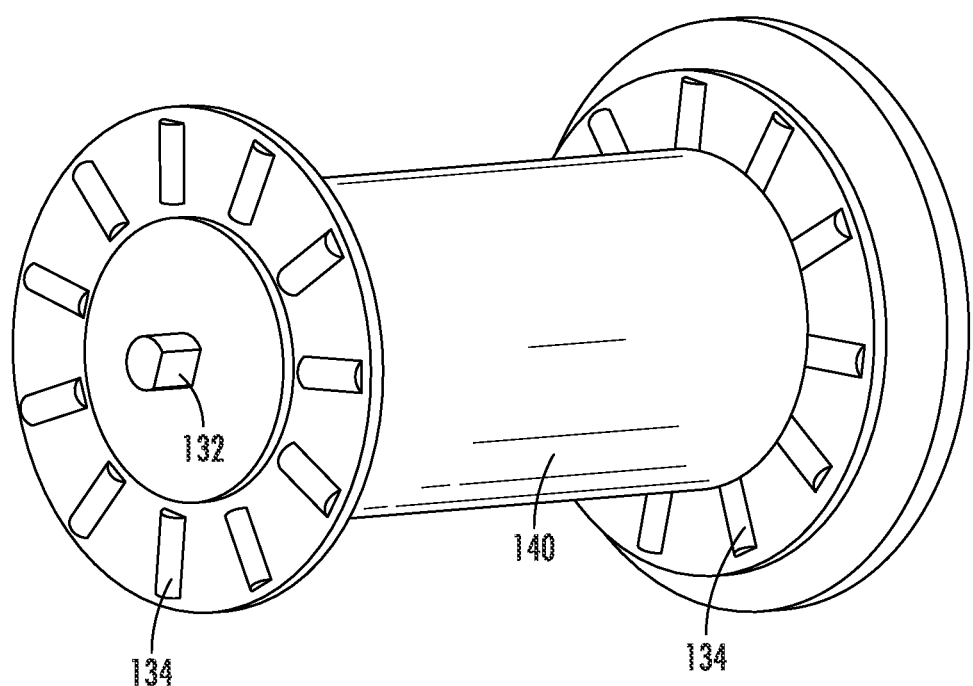
Figure 4B:
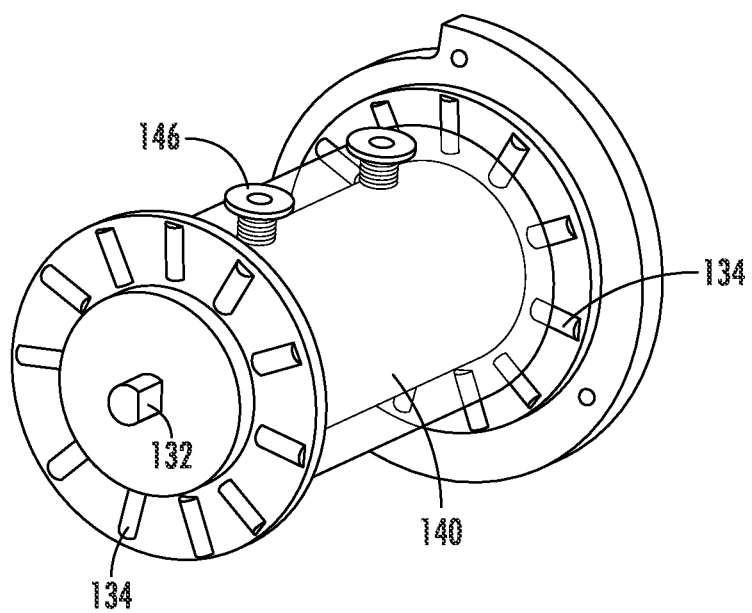
Figure 5:
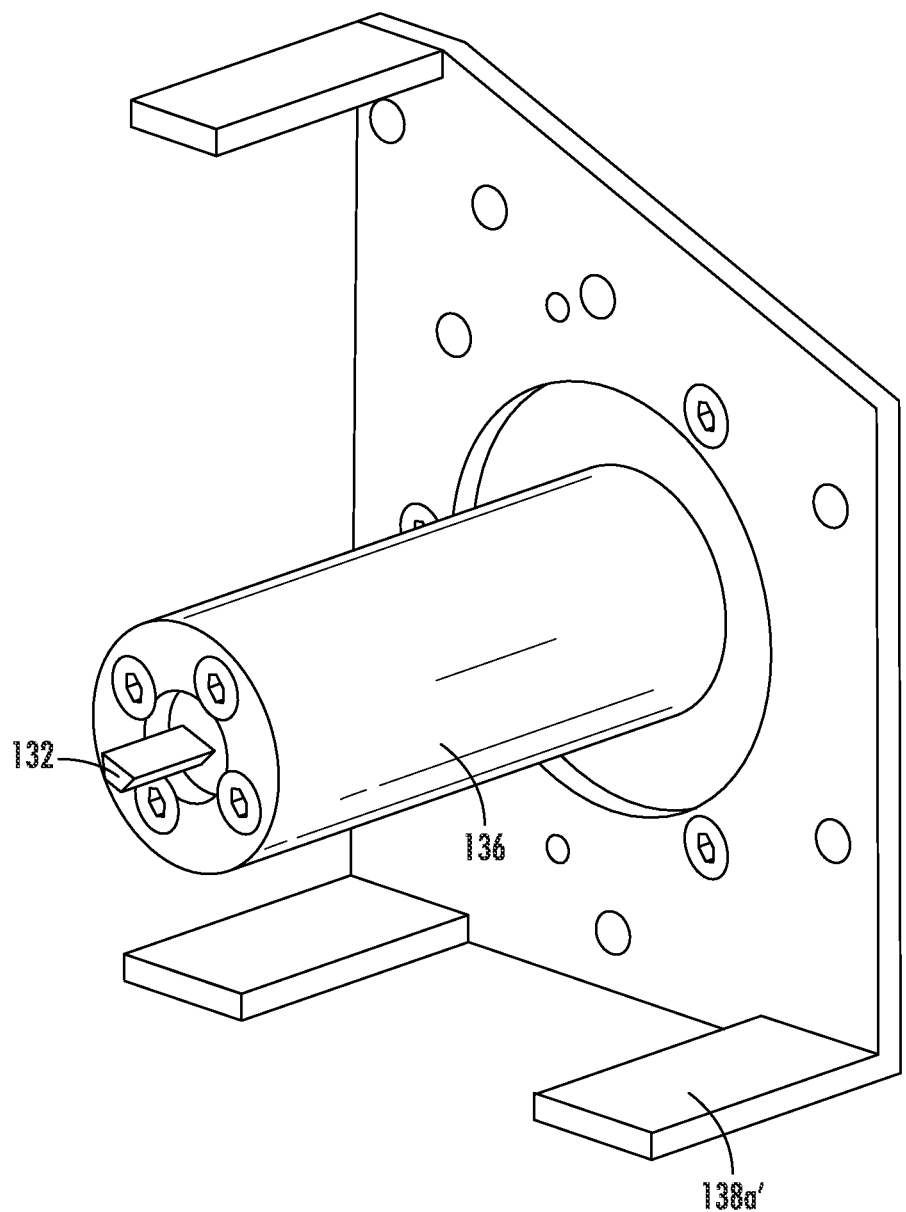
Figure 6B:
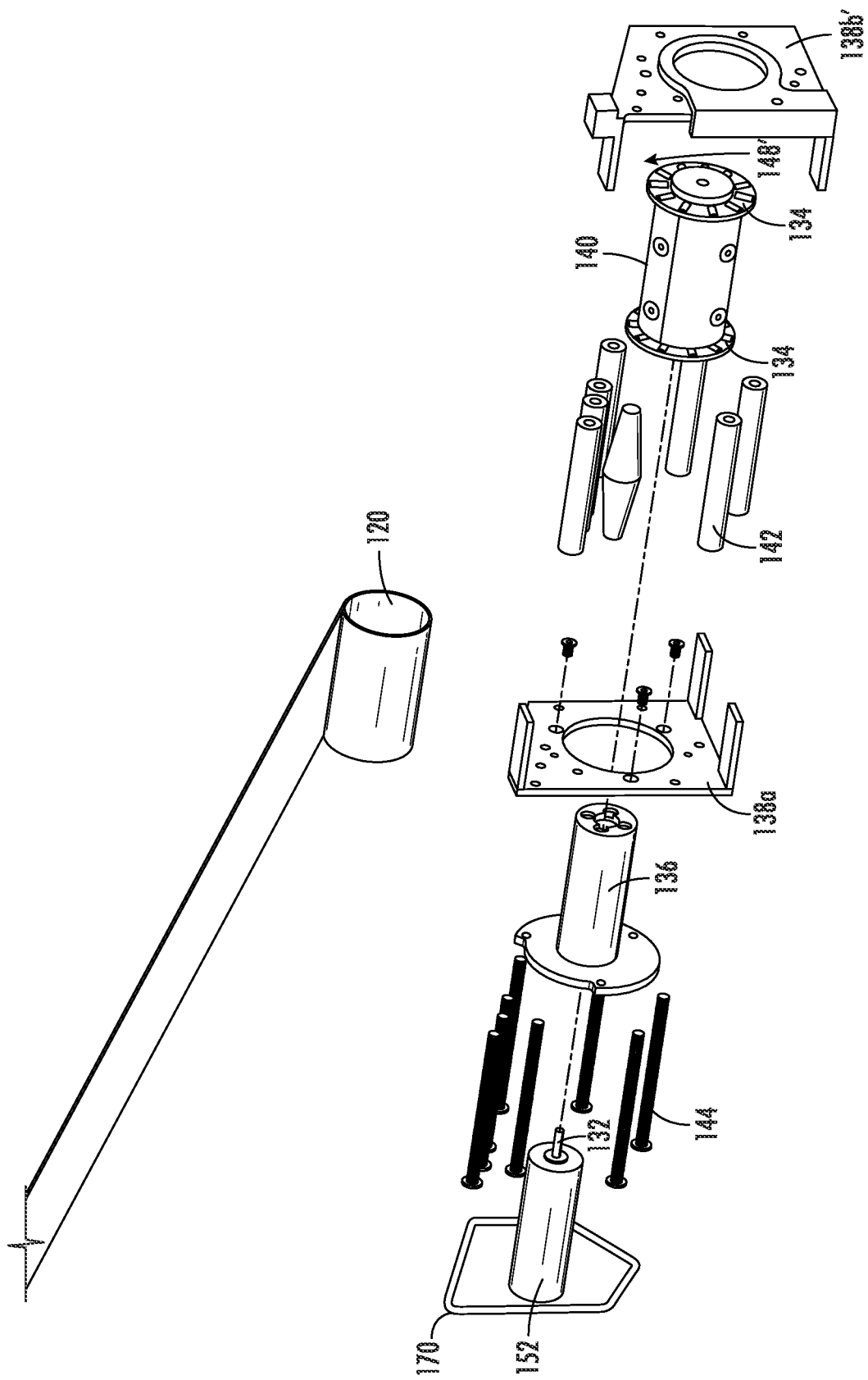
Figure 7:
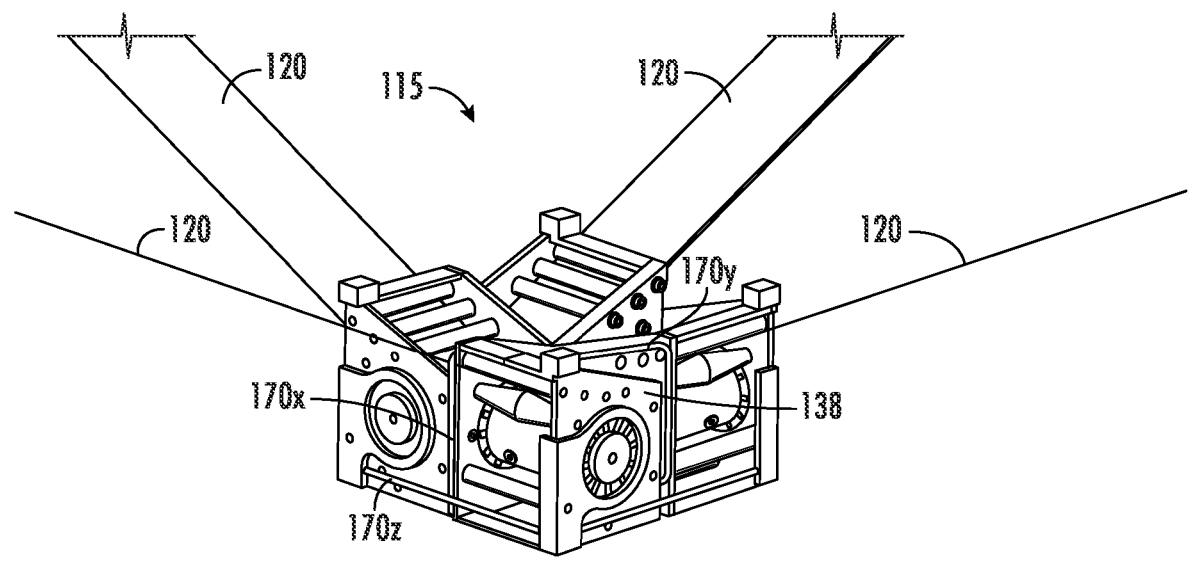
Figure 8:
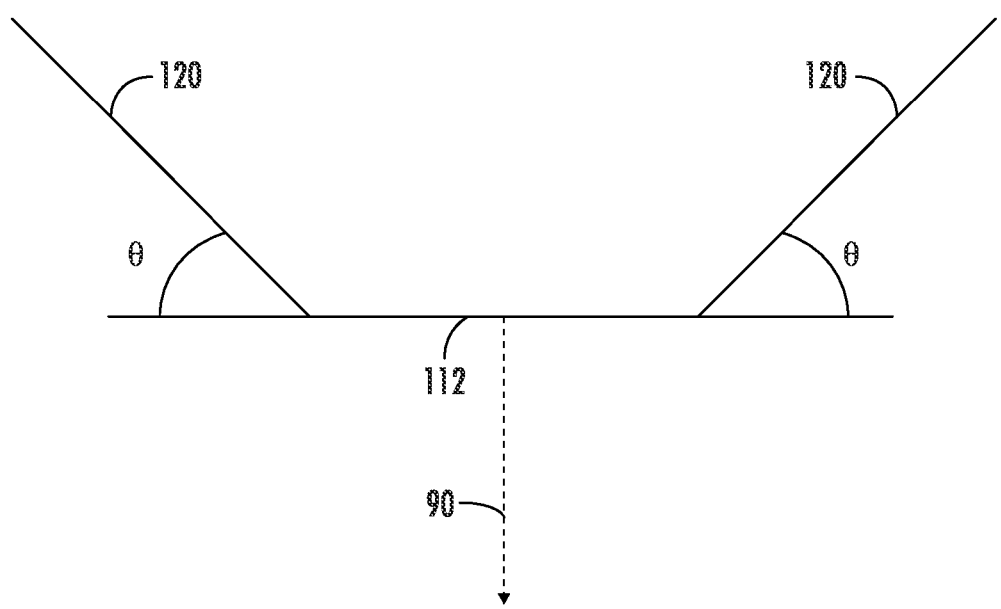
Figure 9:
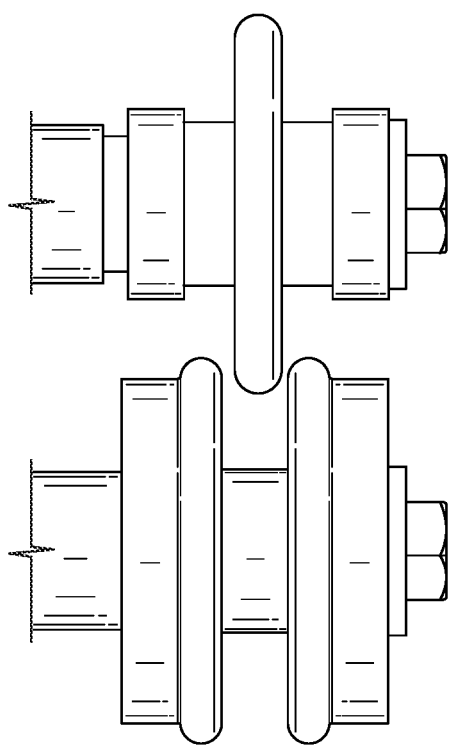
Figure 10:
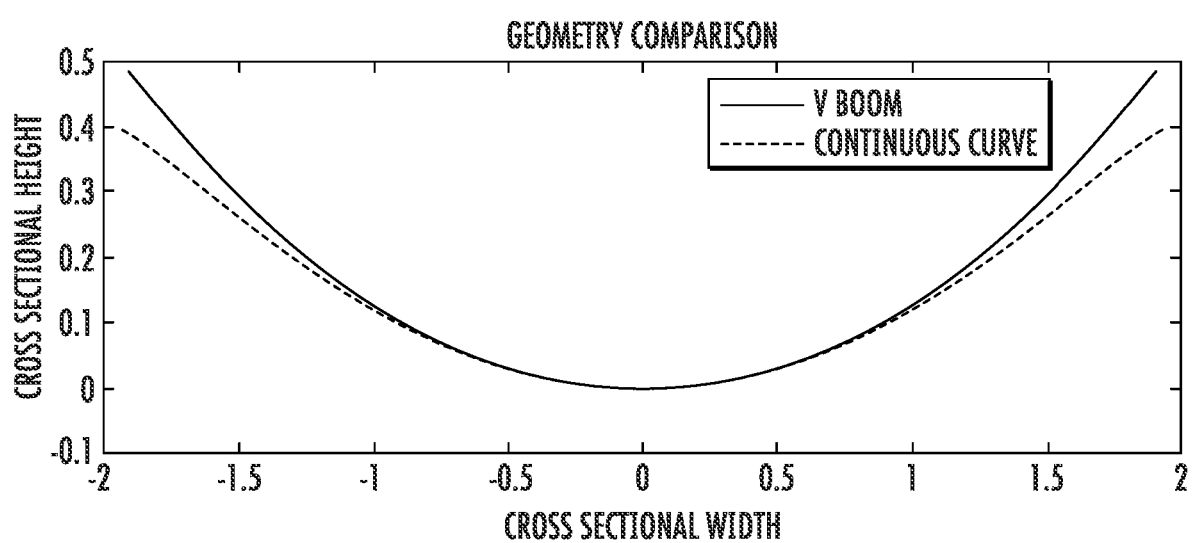
Figure 11:
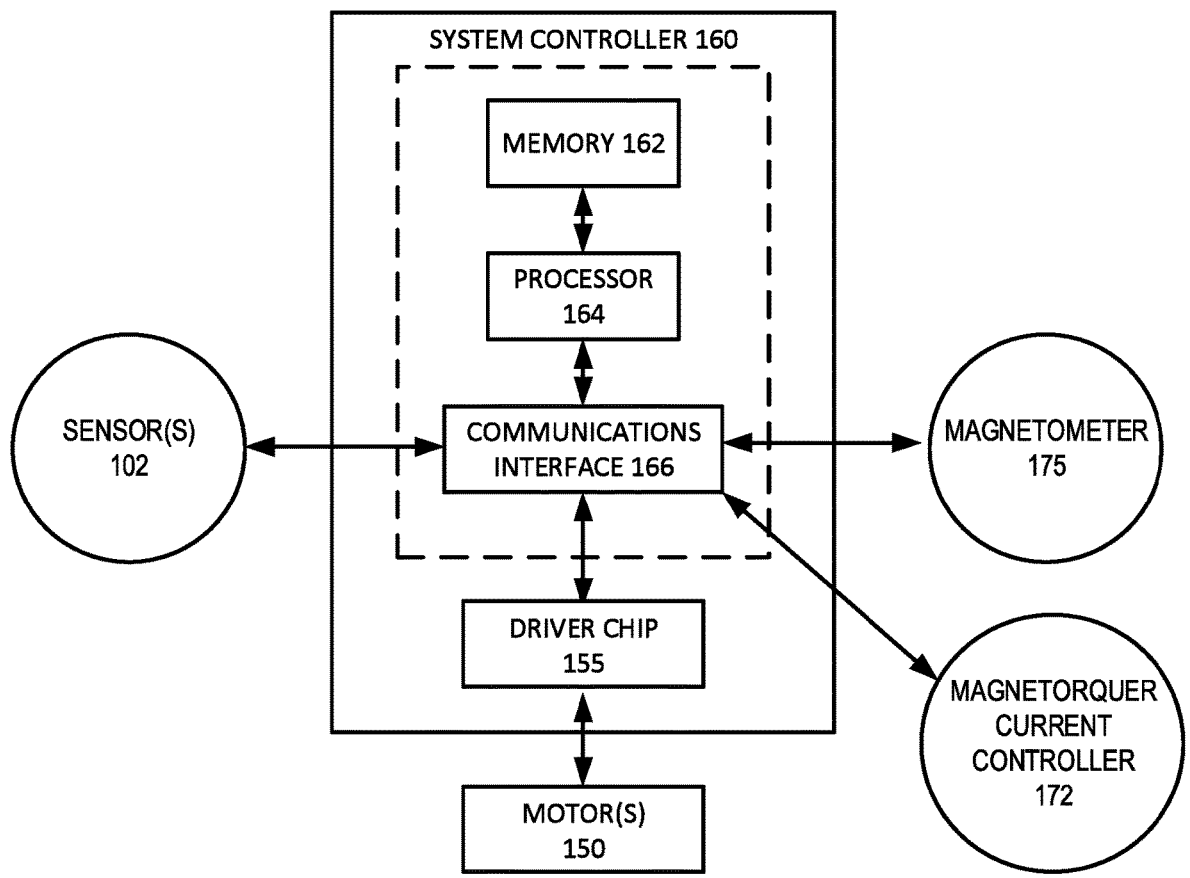
Figure 12:
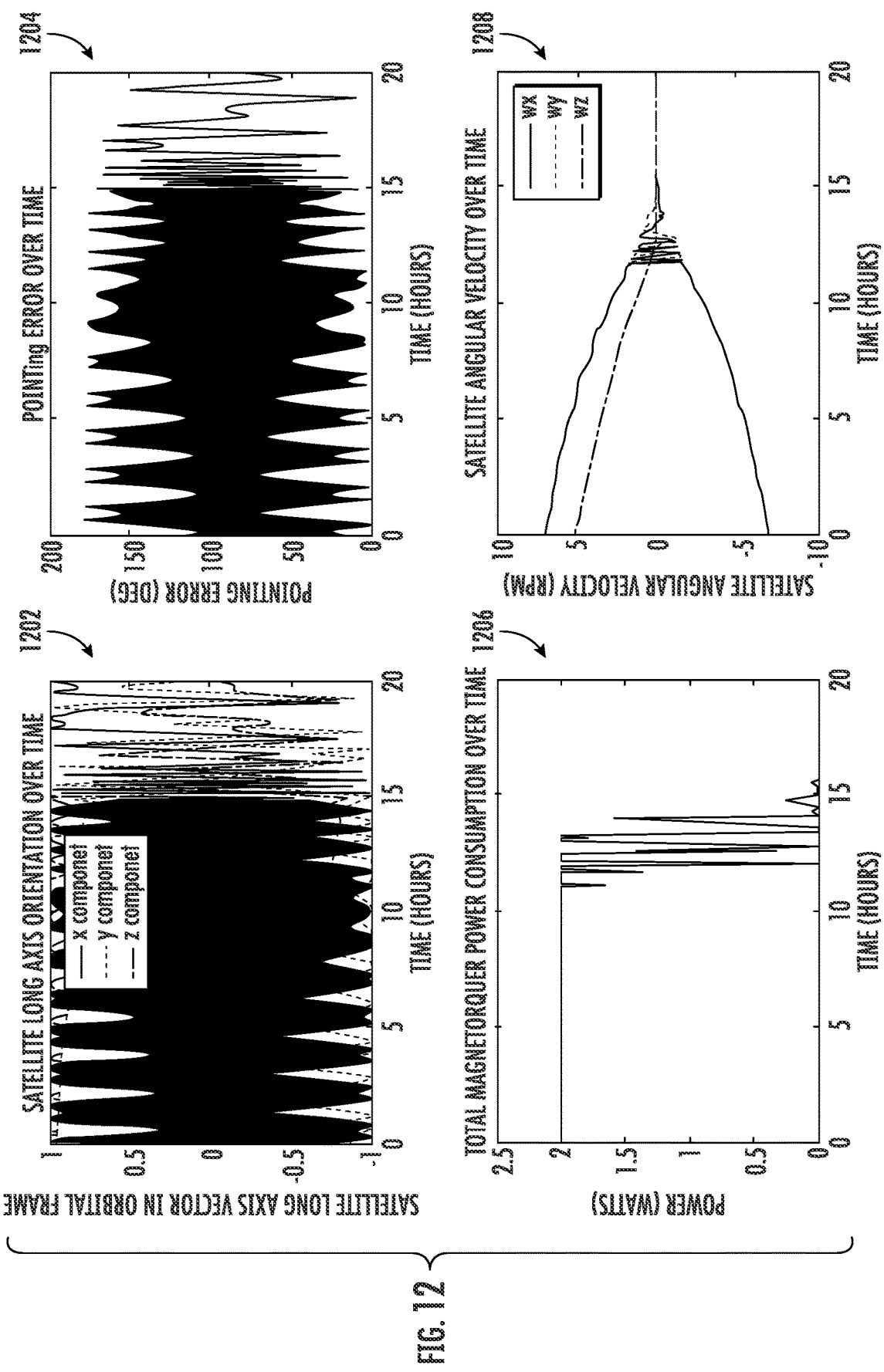
Figure 13:
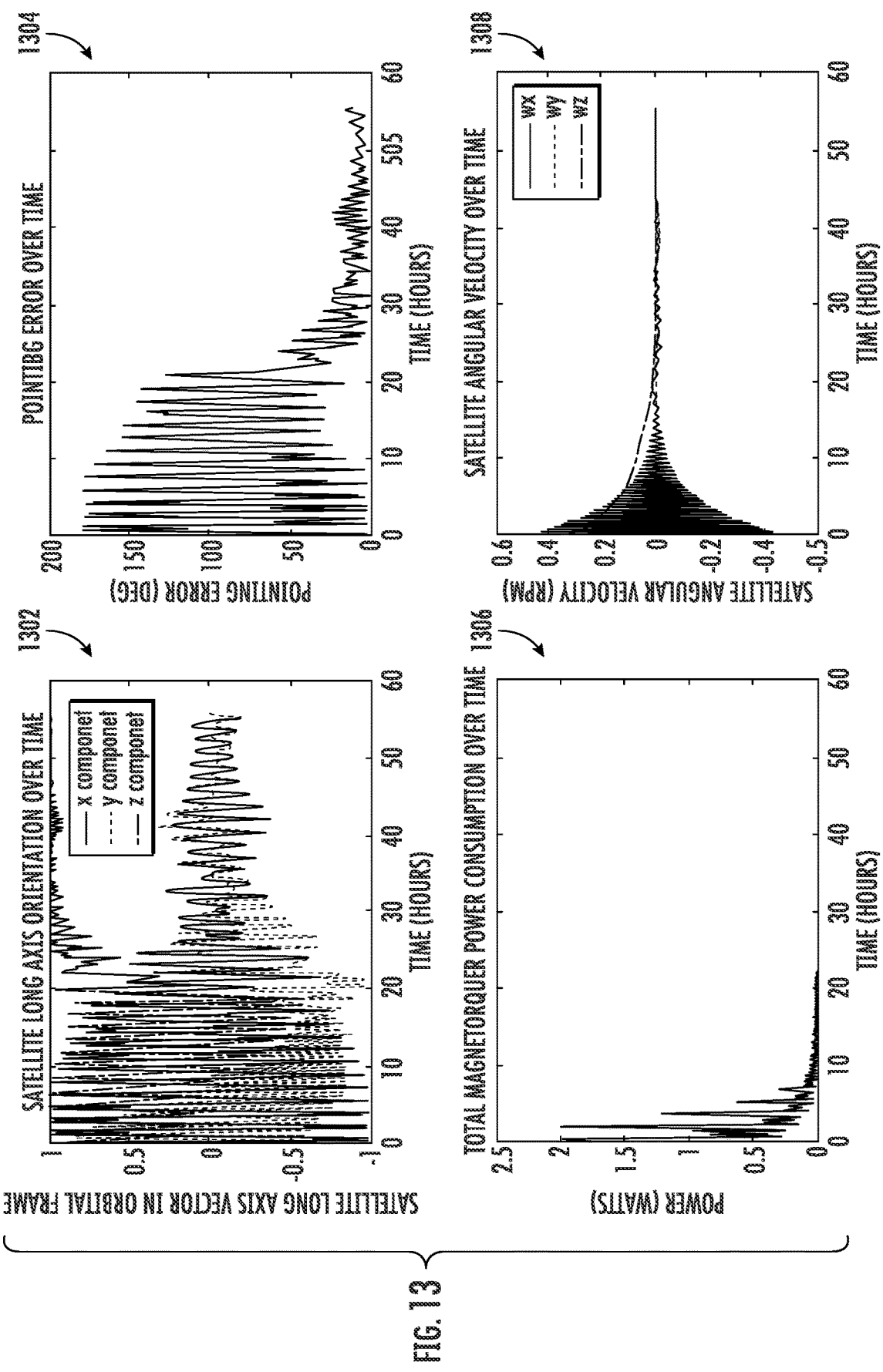
Figure 14:
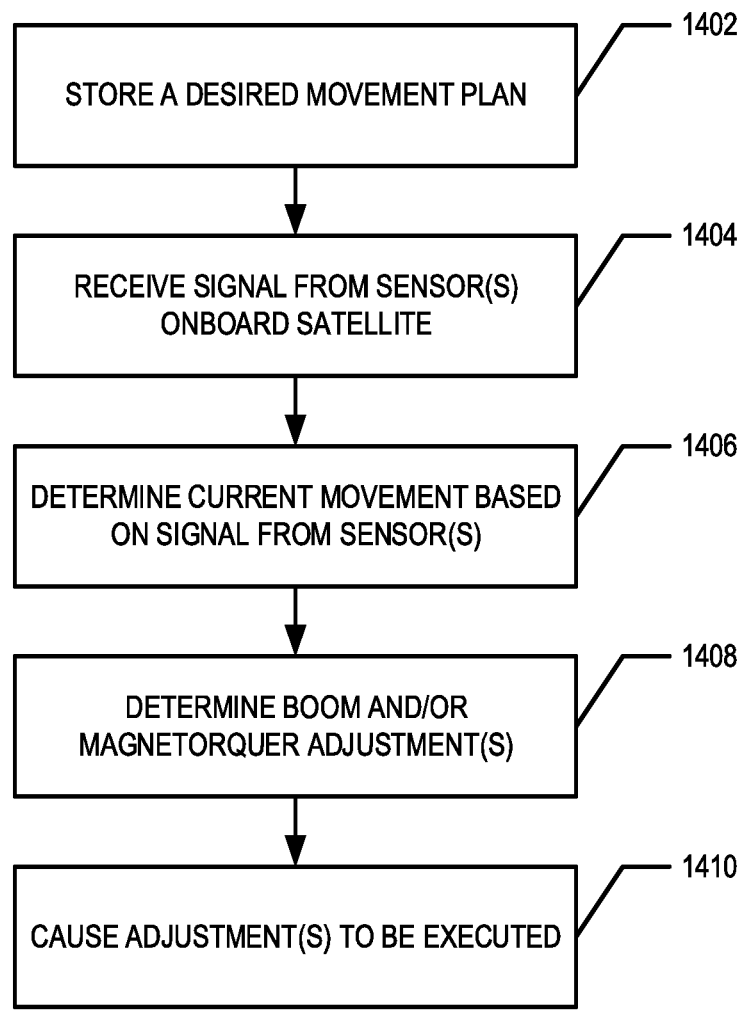

Having thus described the invention in general terms, reference will now be made to the accompanying drawings, which are not necessarily drawn to scale, and wherein:

FIG. 1 is a perspective view of a satellite comprising an AODCS, in accordance with an embodiment of the present invention;

FIG. 1A is a schematic diagram showing a desired movement of the satellite and the current movement of the satellite, in accordance with an embodiment of the present invention;

FIG. 1B is a schematic diagram showing a current attitude of the satellite, in accordance with an embodiment of the present invention;

FIG. 2 shows an AODCS, in accordance with an embodiment of the present invention;

FIG. 3A shows a boom of the AODCS attached to a drum, in accordance with an embodiment of the present invention;

FIG. 3B shows a boom of the AODCS attached to a drum, in accordance with another embodiment of the present invention;

FIG. 4A shows a drum attachment mechanism, in accordance with an embodiment of the present invention;

FIG. 4B shows a drum attachment mechanism, in accordance with another embodiment of the present invention;

FIG. 5 shows a portion of a drum attachment mechanism, in accordance with an embodiment of the present invention;

FIG. 6A shows an exploded view of a boom and a drum attachment mechanism, in accordance with an embodiment of the present invention;

FIG. 6B shows an exploded view of a boom and a drum attachment mechanism, in accordance with another embodiment of the present invention;

FIG. 7 shows an AODCS, in accordance with an embodiment of the present invention;

FIG. 8 is a partial cross sectional view of the satellite showing the relationship between the satellite and the inclination of two of the booms;

FIG. 9 shows an example geometry of rollers that may be used to bend the booms, in accordance with an example embodiment;

FIG. 10 is a plot comparing a V-shaped cross section of a boom to a continuously curved cross section, in accordance with an example embodiment;

FIG. 11 shows a block diagram of a system controller, in accordance with an example embodiment of the present invention;

FIG. 12 illustrates the satellite angular velocity over time when running the B-dot de-tumble procedure, in accordance with an example embodiment of the present invention;

FIG. 13 illustrates the expected system performance and stability of an example embodiment of the present invention;

FIG. 14 provides a flowchart illustrating processes and procedures performed by a system controller to provide attitude and orbit control using an AODCS, according to an example embodiment.

DETAILED DESCRIPTION OF VARIOUS EMBODIMENTS

The present invention now will be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

FIG. 1 shows an example satellite 100 comprising an attitude and orbital control system (AODCS) 115. In particular, the satellite 100 comprises the satellite body 110 and the AODCS 115. The satellite body may comprise any variety of components such as science instruments, telecommunications components, and/or the like. In example embodiments, the satellite 100 is a 2 U-12 U (wherein U represents a 10×10×10 cm unit) CubeSat. In an example embodiment, the AODCS 115 weighs no more than 1.33 kg. In an example embodiment, the AODCS 115 comprises one or more selectively retractable booms 120. In various embodiments, the dart-like shape of the satellite 100 with the booms 120 extended causes the satellite 100 to naturally and/or passively ram-align due to aerodynamic forces. For example, the aerodynamic stabilization caused by one or more booms 120 being extended may constrain one axis of the satellite to generally align with the direction of the velocity of the satellite. For example, partially retracting two of the booms 120 opposite each other results in a clear minimum moment of inertia axis which will simultaneously tend to align with the nadir vector due to gravity gradient torques. The combination of a first axis of the satellite aligning with the direction of the velocity of the satellite and a second axis of the satellite aligning with the nadir vector results in 3-axis attitude stabilization of the satellite. Additionally, deploying or retracting all of the booms 120 (in full or in part) simultaneously varies the aerodynamic drag force 5 experienced by the satellite 100 without upsetting the attitude stability thereof. In an example embodiment, the AODCS 115 may further comprise one or more magnetorquers 170 (see FIG. 2). For example, the AODCS 115 may comprise five magnetorquers configured to utilize the B-dot de-tumble law to damp oscillations about the equilibrium attitude.

As shown in FIG. 2, in example embodiments, an AODCS 115 comprises one or more booms. Each boom is secured to the satellite body 110 by a deployer 130. The deployer 130 may be configured to extend and retract the corresponding boom 120; hold the corresponding boom 120 at a particular angle or inclination; adjust the angle or inclination of the corresponding boom, and/or the like. In example embodiments, the AODCS 115 further comprises one or more magnetorquers 170 and/or a magnetometer 175 (see FIG. 11). In example embodiments, the AODCS 115 weights less than 1.33 kg and occupies a volume of no more than 1U (e.g., 10×10×10 cm). In example embodiments, the AODCS 115 is easy to integrate into a standard CubeSat structure and the external dimensions of the AODCS 115 conform to CubeSat standards. In one embodiment, the AODCS is configured to successfully de-orbit a 12U, 15 kg satellite from 700 km circular orbit in under 25 years assuming standard atmospheric conditions. In other embodiments, the AODCS is configured to successfully de-orbit satellites that are smaller than 15 kg or larger than 15 kg (e.g., 100 kg). The AODCS 115 may be configured to enable the spacecraft to maintain passive ram-alignment within 15 degrees up to an altitude of 700 km. In example embodiments, the one or more booms 120 of the AODCS 115 are retractable such that the aerodynamic profile of a satellite 100 comprising an AODCS 115 is the same as the aerodynamic profile of the satellite body 110 when the booms 120 are fully retracted. In example embodiments, the computing and control mechanisms for operating the AODCS 115 is self-contained and capable of receiving commands from the satellite bus of compatible hardware of the satellite body 110. In an example embodiment, the peak power for operating the AODCS 115 is less than 20 W. In example embodiments, the peak power for operating the AODCS 115 (e.g., extending and/or retracting one or more booms) is under 4 W for a time period of up to 30 seconds. In example embodiments, little or no angular momentum is transferred to the satellite 100 during the extension or retraction of one or more booms 120 of the AODCS 115. In some embodiments, the components of the AODCS 115 may be configured to demise on reentry so as to not create additional debris upon reentry to the Earth's atmosphere. In an example embodiment, each boom 120 is capable of undergoing at least 500 cycles of deployment and retraction before experiencing fatigue-induced failures.

In example embodiments, an AODCS 115 comprises four booms 120 and four deployers 130, with each deployer 130 configured to extend and/or retract one of the booms 120. The four deployers 130 may be mounted such that a first deployer is rotated 90 degrees with respect to the two adjacent deployers 130. For example, each boom 120 may be a thin strip. For example, in an example embodiment, the satellite 100 is approximately 15 kg and each boom has a fully deployed length of approximately 3.7 meters, a flat width of approximately 4 cm, and a thickness of approximately 0.127 mm. In an example embodiment, the thickness of a boom 120 is approximately 0.0762 mm. In an example embodiment, the cross wind width of a boom 120 is approximately 3.8 cm after the boom is rolled. However, it should be understood that the length, width, and/or thickness of the booms 120 may be adjusted based on the mass of the satellite, the expected orbit of the satellite, and/or the like. As should be understood, the size and/or mass of the satellite and the orbit the satellite is expected to be launched into may affect the drag necessary to successfully de-orbit the satellite. The dimensions of booms 120 may therefore be adjusted and/or scaled as appropriate for the particular application of the AODCS 115. For example, if the satellite is a 12U CubeSat weighing 15 kg and it is planned to place the satellite 100 into a 700 km circular orbit, the cross-wind area of the booms 120 when fully extend is approximately 0.5 m². As should be understood, the cross-wind area of the booms 120 may be determined based on the size and/or weight of the satellite 100 and/or the planned orbit of the satellite such that the satellite 100 may be de-orbited in 25 years or less. In an example embodiment, each boom 120 is made of stainless steel. For example, in an example embodiment, each boom 120 is rolled from 0.003 inch (0.0762 mm) think Austenitic 316 stainless steel stock.

In example embodiments, each boom 120 may be secured to the corresponding deployer 130 by a drum that is wrapped about the shaft of a corresponding motor. FIG. 3A shows a boom 120 secured to a drum 140. In example embodiments, the boom 120 is attached to the drum 140 by a twist-lock. For example, the boom 120 may comprise a securing slit 125 through which a twist-lock 145 of the drum may pass and then be rotated to secure the boom 120 to the drum 140. As should be understood, various other attachment techniques may be used to secure the boom 120 to the drum 140 and/or to the deployer 130. For example, as shown in FIG. 3B, four screws or rivets may be used to secure the boom 120 to the drum 140. In an example embodiment, the drum 140 is made of aluminum.

In example embodiments, the deployer 130 may comprise a motor assembly configured to allow a boom 120 to be extended and/or retracted by rotating the drum 140 to which the boom 120 is secured. FIGS. 4A, 4B, 6A, and 6B show how the drum 140 may be secured and/or wrapped about a shaft of a motor 150. In particular, a sleeve 136 may be positioned over a motor shaft 132, over the gearbox 152, and/or over the motor 150. The drum 140 may then be disposed about the sleeve 136 and secured in place by thrust bearings 134. For example, an end of the drum 140 may comprise a shoulder for receiving a thrust bearing 134 thereabout. For example, a thrust bearing 134 may be mounted to an end of the drum closest to the motor shaft 132. The motor 150, motor shaft 132, sleeve 136, thrust bearings 134, and drum 140 may be disposed within a deployer housing 138. In example embodiments, the deployer housing 138 may comprise two portions (e.g., 138a and 138b) that may be secured together once the motor assembly is assembled therein. For example, a set of rollers 142 (e.g., a set of eight rollers 142) may be used to separate the two portions of 138a' and 138b' of the deployer housing 138 as shown in FIG. 6B. In an example embodiment, the motor 150 is a stepper motor. For example, in one embodiment, the motor 150 is a Faulhaber AM1524 stepper motor. In an example embodiment, the motor 150 has an attached gearbox 152. In an example embodiment, the gearbox 152 is an 81:1 gearbox. For example, the high reduction ratio of the gear box 152 ensures that the boom 120 cannot back drive the stepper motor 150. For example, a rotary encode may not be necessary for deployment of the booms 120, allowing for a simplified system. The base of the motor 150 is fastened inside the sleeve 136 and thereby secured within the deployer housing 138. In an example embodiment, if the power available to the AODCS 115 is to be limited, a rotary encoder may be used to enable the use of a brushless direct current motor (e.g., rather than a stepper motor) to reduce power consumption. In an example embodiment utilizing a rotary encoder, the rotary encoder may be driven by a roller that is driven directly by the boom so as to provide more accurate deployment measurements.

FIG. 6B provides an exploded view of another embodiment of a deployer 130 for selectively deploying and/or retracting a boom 120. In an example embodiment, the base of the motor 150 is fastened within the sleeve 136. The base of the motor 150 is fastened, secured, and/or the like, to the deployer housing 138 (e.g., deployer housing portion 138a' as shown in FIG. 5).

In example embodiments, the deployer housing 138 comprises a deployment slit 148. In example embodiments, the deployment slit 148 may be configured to hold the boom at a specific angle with respect to the satellite body 110. As shown in FIG. 8, each boom may be configured to extend and be maintained at an angle θ with respect to the back surface 112 of the satellite body 110 and/or with respect to the plane normal to the velocity 90 of the satellite 100. In example embodiments, the angle θ is 20°. However, other angles may be used as appropriate for the application. For example, the angle θ may be larger or smaller than 20° and the fully extended lengths of the booms 120 may adjusted accordingly such that the booms 120, when fully extended, provide an appropriate cross-wind area for producing the required drag forces for de-orbiting the satellite. In an example embodiment, the angle θ may be adjustable. In other embodiments, the angle θ is predefined and not adjustable.

In example embodiments, the cross section of a boom 120 may be curved. For example, the cross section of the boom 120 may be curved to prevent curling or buckling of the boom 120 when extended. In example embodiments, the booms 120 may have a V-shaped cross section and/or a V-shaped cross section with a rounded base. In example embodiments, the booms may be curved using a three-point bending technique using nylon rollers. FIG. 9 shows an example geometry of a nylon rollers that may be used to bend the booms 120. For example, a female roller with curved edges may be used to hold the boom in place for bending while a male roller with a tip radius of curvature of 4 mm may be used to produce the desired boom cross section. FIG. 10 illustrates the difference between the V-shaped cross section of a boom 120 of an example embodiment and a continuously curved cross section.

In example embodiments, the AODCS 115 further comprises one or more magnetorquers 170. In example embodiments, the ACOS 115 may comprise five magnetorquers 170. For example, four magnetorquers 170 may be disposed between adjacent and/or neighboring deployers 130 and a fifth magnetorquer 170 may be disposed on a surface created by at least one deployer 130 and within a plane that is generally parallel to the back surface 112 of the satellite body 110. Each magnetorquer 170 may comprise a coil of wire configured to allow a current to flow therethrough, thereby creating a magnetic field that may interact with a magnetic field external to the satellite 100. The magnetorquers 170 may therefore allow the external magnetic field provide a torque on the satellite 100 that may be used to reduce and/or increase the angular momentum of the satellite 100 without directly affecting the forward momentum of the satellite. In example embodiments, the AODCS 115 may further comprise a magnetometer 175 that may provide a measurement of the external magnetic field to the system controller 160. In an example embodiment, the magnetometer 175 is a three axis magnetometer. The system controller 160 may then use the measurement of the external magnetic field to determine a current to be applied to each and/or at least one magnetorquer 170 to cause the desired effect on the satellite's 100 angular momentum. For example, the system controller 160 may provide instructions and/or cause a magnetorquer current controller 172 (See FIG. 11) to provide a determined current to one or more magnetorquers 170. For example, the magnetorquers 170 may be used as a de-tumble controller. For example, when the satellite 100 is first launched, the satellite 100 may be in a tumbling state. The magnetorquers 170 may be used to adjust the angular momentum of the satellite 100 so as to reduce the tumbling of the satellite 100 and ensure that eventually (e.g., over a period of approximately 24 hours) the satellite 100 exits the tumbling state and enters a stable attitude state. In example embodiments, the booms 120 are not extended until after the satellite 100 has exited the tumbling state. For example, the system controller 160 may use the magnetorquers 170 to execute a B-dot de-tumble technique.

Magnetorquers 170 are coils of wire that generate a magnetic field when an electric current is run through them. This magnetic field interacts with the Earth's magnetic field and can be manipulated using the B-dot de-tumble law to reduce the angular velocity of the satellite 100. The larger the mass of the conducting wire in a magnetorquer 170, the larger the magnetic moment (and hence a resulting magnetic torque) that the magnetorquer 170 can provide with a given amount of input current or power. The mass of a magnetorquer may be increased by adding additional turns or increasing the number of loops in the magnetorquer coil or by increasing the thickness of the wire that is coiled to make the magnetorquer. As should be understood, increasing the number of loops in the coil increases the resistance of the coil. Conversely, a thicker wire results in a lower internal resistance of the magnetorquer coil. The desired resistance of the magnetorquer coil is determined such that the resistance is large enough that the power supply will not overheat when providing a current through the magnetorquer and small enough that sufficient current flow may be provided by the power supply. In an example embodiment, the power supply is a 3.3V power system capable of supplying up to 15 W. In an example embodiment, the combined mass of all of the magnetorquers is approximately 100 g. In an example embodiment, four of the magnetorquers 170 may be formed by wrapping wire about the mechanical fasteners 144 that hold together the deployer housing 138. For example, the x and y magnetorquers 170x and 170y, may be formed by wrapping wire about the mechanical fasteners 144, as shown in FIG. 7. For example, the mechanical fasteners 144 may be screws and the at least one of the magnetorquers 170 may be formed by wrapping wire about the screw heads. In an example embodiment, one of the magnetorquers (e.g., the z magnetorquer 170z) may be formed by wrapping wire around the entire four deployer system. In an example embodiment, each of the x and y magnetorquers 170x, 170y use 160 turns of 25 gauge wire. In an example embodiment, the AODCS 115 comprises two x magnetorquers 170x and the x magnetorquer turns are evenly divided between the two x magnetorquers. For example, each of the two x magnetorquers 170x may comprise 80 turns, in an example embodiment. Similarly, in an example embodiment, the AODCS 115 comprises two y magnetorquers 170y and the y magnetorquer turns are evenly divided between the two y magnetorquers. For example, each of the two y magnetorquers 170y may comprise 80 turns, in an example embodiment. In an example embodiment, the z magnetorquer is formed with 40 turns of 25 gauge wire.

FIG. 11 provides a block diagram of a system controller 160 configured to control the motors 150 that extend and retract the booms 120. In an example embodiment, the system controller 160 may be microcontroller. For example, the system controller 160 may be an OLinuXino Nano controller with iMX223 ARM926J processor operating at 454 Mhz. In an example embodiment, a Xiphos Q7 microcontroller may be used as the system controller 160. In an example embodiment, a stepper controller is used to drive each deployer (e.g., motor 150). For example, the stepper controller may convert a direction and pulse input into stepper inputs for the motor 150. In an example embodiment, a brushed or brushless dc motor may be used with a rotary encoder driven using a driver chip in place of the stepper controller. In an example embodiment, H-bridges are used to control the magnetorquers.

For example, the system controller 160 may comprise a system-on-a-chip comprising memory 162, processor 164, and a communication interface 166. For example, the system-on-a-chip may be an Intel Edison board. The memory 164 may be configured to store executable code for algorithms related to orbital maneuvering and de-orbit point targeting using aerodynamic drag. The processor 164 may be configured to execute the executable instructions and cause the driver chips 155 to operate the motors 150 and/or the magnetorquers 170 in accordance with the planned orbital maneuvering and/or de-orbit point targeting.

The communication interface 166 may be configured to communicate with the satellite control system through, for example, the satellite bus. The communication interface 166 may further be configured to receive measurements and/or signals indicating measurements of the magnetometer 175 or feedback from one or more other sensors 102.

In an example embodiment, the attitude or orbit of a satellite 100 may be controlled. For example, a desired movement plan providing information regarding the desired angular momentum, attitude, orbit, and/or the like of the satellite 100 at various times during the operational lifetime of the satellite, may be stored in memory 162, and/or the like. For example, as shown in FIG. 1A (which is obviously not drawn to scale), the desired movement plan may comprise a desired position vector 90 and a desired velocity vector 95 over time (e.g., as a function of time). The desired position vector 90 indicates the location of the satellite 100 with respect to an Earth Centered Inertial (ECI) reference frame centered at the center of the Earth 10 and the desired velocity vector 95 indicates the rate of change of the desired position vector as viewed from the ECI frame. In an example embodiment, the current movement is considered to be aligned with the desired movement plan when the current position vector 190 and current velocity vector 195 of the satellite 100 are equivalent to the desired position 90 and velocity vectors 95 within a specified tolerance. For example, the current position and velocity vectors 190, 195 may be equal to the desired position and velocity vectors 90, 95 within the specified tolerance when the current position vector 190 is within a predetermined and/or configurable angle of the desired position vector 90 and/or when the current velocity vector 195 is within a predetermined and/or configurable angle of the desired velocity vector 95.

The movement plan may also consist of a desired spacecraft attitude, defined as the orientation of a spacecraft-fixed reference frame with respect to an orbit-fixed reference frame. The movement plan may also be specified in terms of the alignment between a given spacecraft-fixed vector and an orbit-fixed vector. In an example embodiment, the current movement is considered to be aligned with the desired movement plan when a normal vector to a particular face of the satellite is within a configurable angle of the current orbital velocity vector 195. For example, the current movement may be aligned with the desired movement plan when z-axis of the spacecraft-fixed reference frame and/or the long axis 105 defined by the satellite body (e.g., axis through the AODCS) is within a configurable angle α of the current orbital velocity direction 195, as shown in FIG. 1B. In an example embodiment, the desired movement plan may indicate and/or define the configurable angle in general, for a particular point in time, for a particular portion of the satellite's 100 lifetime, for a particular portion of the satellite's 100 orbit, and/or the like. In an example embodiment, the configurable angle is 15°.

The system controller 160 may receive signals from one or more sensors 102 onboard the satellite 100. For example, signals from the magnetometer 175, one or more angular momentum sensors 102, and/or the like may be received. Based on the received sensor signals, the current movement of the satellite 100 may be determined and/or computed, for example, by the processor 164. Based on the current movement and the desired movement plan, one or more boom adjustments and/or one or more magnetorquer adjustments may be determined. For example, the processor 164 may determine, based on the current movement and the desired movement plan, that one or more booms 120 should be extended or retracted to affect the drag on the satellite 100. In another example, the processor 164 may determine one or more currents that should be circulated through one or more magnetorquers 170 to affect the angular momentum of the satellite 100. The processor 164 may then generate instructions and/or communicate with one or more driver chips 155 to cause the determined boom adjustments and/or magnetorquer adjustments to be completed. For example, the processor 164 may cause one or more driver chips 155 to activate one or more motors 150 to cause one or more booms 120 to be extended and/or retracted. For example, the processor 164 may cause one or more driver chips 155 to cause an electrical current in one or more magnetorquers 170.

In an example embodiment, a computer program product may store executable instructions for controlling the attitude and/or orbit of a satellite 100. In an example embodiment, the computer program product may be the memory 162. In an example embodiment, the computer program product comprises at least one non-transitory computer-readable storage medium (e.g., non-volatile memory) having computer-executable program code instructions stored therein. In an example embodiment, the computer-executable program code instructions comprise program code instructions configured to receive signals from at least one of one or more angular velocity sensors 102 (e.g., gyroscopes, etc.), one or more magnetometers 175, and/or one or more other sensors 102 onboard a satellite; determine a current movement of the satellite based on the received sensor signal(s); access a desired movement plan in one or more memory storage areas; determine at least one of one or more boom adjustments or one or more magnetorquer adjustments needed to adjust the current movement of the satellite to align with the desired movement plan; and cause one or more booms to be extended and/or retracted based on the determined one or more boom adjustments and/or cause a current to flow/circulate within one or more magnetorquers based on the determined one or more magnetorquer adjustments.

As described above, when a satellite 100 is initially deployed, the satellite 100 may have some angular momentum and may be in a tumbling state. The system controller 160 may operate the magnetorquers 170 so as to reduce the angular momentum. For example, the system controller 160 may operate the magnetorquers 170 in accordance with the B-dot de-tumble law to reduce the angular momentum of the satellite 100. FIG. 12 illustrates the satellite angular velocity and the magnetorquer power consumption over time when the magnetorquers 170 are operated in accordance with the B-dot de-tumble law according to a simulation in which the booms 120 are fully retracted. Panel 1202 shows the satellite long axis (e.g., z axis) orientation over time. Panel 1204 shows the pointing error over time. The pointing error is defined as the angle between the satellite long axis and the velocity vector of the satellite 100. This error oscillates randomly because there are no aerodynamic torques to align the satellite with the velocity vector. Panel 1206 shows the total magnetorquer power consumption over time. Note that the magnetorquer power consumption after the initial de-tumble is almost zero. Panel 1208 shows the satellite angular velocity over time.

FIG. 13 illustrates simulation results for a simulation including magnetic torque from the B-dot de-tumble law, aerodynamic torques corresponding to four booms 120 being fully deployed, and gravity gradient torques corresponding to all four of the booms 120 being fully deployed. The booms 120 are simulated as being non-ferromagnetic. Panel 1302 shows the satellite long axis (e.g., z axis) orientation over time. Panel 1304 shows the pointing error over time. The pointing error is defined as the angle between the satellite long axis and the velocity vector of the satellite 100. This error oscillates randomly because there are no aerodynamic torques to align the satellite with the velocity vector. Panel 1306 shows the total magnetorquer power consumption over time. Note that the magnetorquer power consumption after the initial de-tumble is almost zero. Panel 1308 shows the satellite angular velocity over time. The aerodynamically stable dart configuration created by the deployed booms 120 means that if the satellite 100 is perturbed from its ram-aligned configuration, an aerodynamic restoring force will act to re-align the long axis of the satellite (e.g., the z axis) with the velocity vector. With the booms 120 fully deployed, the long axis of the satellite or the z axis (the axis going through the center of the drag device) is the maximum moment of inertia axis. Because gravity gradient torques work to align the minimum moment of inertia axis with the nadir vector, the maximum moment of inertia axis must be perpendicular to the nadir vector; a constraint which aids in maintaining ram-alignment.

FIG. 14 provides a flowchart illustrating processes and procedures that may be completed to provide attitude and orbit control of a satellite 100 using an AODCS 115. Starting at block 1402, a movement plan is stored. For example, the movement plan may be stored in memory 162. In an example embodiment, the movement plan may be programmed into the AODCS controller system 160 prior to launch of the satellite 100. In an example embodiment, the movement plan may be received via a communications interface 166 after the launch of the satellite 100.

At block 1404, one or more signals from one or more sensors onboard the satellite 100 are received. For example, a signal from a magnetometer 175, angular momentum sensor 102, and/or other sensor onboard the satellite 100 may be received by the processor 164 via the communication interface 166 and/or the like. At block 1406, the processor 164 may determine the current movement of the satellite 100 based on the received sensor signal(s). For example, the processor 164 may determine an angular velocity vector, a velocity vector, and/or the like based on the received sensor signal(s).

At block 1408, one or more boom and/or magnetorquer adjustments are determined. For example, the processor 164 may determine one or more boom and/or magnetorquer adjustments that would cause the current movement of the satellite 100 to become better aligned with the movement plan. For example, system controller 160 may determine an adjustment (full or partial deployment or retraction) of one or more booms 120 that should cause the current movement of the satellite 100 to become better aligned with the movement plan. For example, the system controller 160 may determine an adjustment (e.g., change in current or power provided to) one or more magnetorquers 170 that should cause the current movement of the satellite 100 to become better aligned with the movement plan. For example, the one or more adjustments may reduce the pointing error of the satellite 100.

At block 1410, the one or more adjustments may be made. For example, the system controller 160 may cause one or more driver chips 155 to operate one or more of the motors 150 to cause the corresponding booms 120 to be retracted or deployed in accordance with the determined adjustment. In an example embodiment, the system controller may cause one or more H-bridges and/or the like to provide current and/or electrical power to one or more magnetorquers in accordance with the determined adjustment.

Many modifications and other embodiments of the invention set forth herein will come to mind to one skilled in the art to which the invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims Although specific terms are employed herein, they are used in a generic and descriptive sense only and not for purposes of limitation.

That which is claimed:

1. An attitude, orbit, and de-orbit control system (AODCS) for a satellite, the system comprising:
    one or more selectively retractable booms, said one or more selectively retractable booms being collectively configured to provide a selectively adjustable drag during de-orbiting of a satellite over a predefined de-orbiting time; and
    a system controller configured to generate one or more instructions for causing retracting or extending of at least one of the one or more selectively retractable booms to control the drag on the satellite.

2. The AODCS of claim 1, wherein the one or more selectively retractable booms comprise four selectively retractable booms.

3. The AODCS of claim 2, wherein:
    a first deployer secures a first boom of the one or more selectively retractable booms to the satellite,
    a second deployer secures a second boom of the one or more selectively retractable booms to the satellite,
    a third deployer secures a third boom of the one or more selectively retractable booms to the satellite,
    a fourth deployer secures a fourth boom of the one or more selectively retractable booms to the satellite, and
    the second deployer being rotated 90 degrees with respect to the first deployer, the third deployer being rotated 180 degrees with respect to the first deployer, and the fourth deployer being rotated 270 degrees with respect to the first deployer.

4. The AODCS of claim 1, wherein each of the one or more selectively retractable booms (a) is secured to a back surface of the satellite and (b) is inclined at an angle of 20° with respect to the back surface of the satellite.

5. The AODCS of claim 1, wherein the one or more selectively retractable booms comprise at least two booms and at least one of:
    each of the at least two selectively retractable booms is independently extendable and retractable; and
    an angle between each of the at least two booms and a direction of travel of the satellite is independently adjustable.

6. The AODCS of claim 1, wherein each selectively retractable boom is V-shaped in cross section.

7. The AODCS of claim 6, wherein each selectively retractable boom has a V-shaped cross section with a rounded base.

8. The AODCS of claim 6 wherein each selectively retractable boom is shaped by three-point bending.

9. The AODCS of claim 1, wherein each selectively retractable boom is secured to a drum.

10. The AODCS of claim 9, wherein the drum is secured to a motor, the system controller is configured to generate one or more instructions for operation of the motor, and the motor is operational to retract or extend one of the booms.

11. The AODCS of claim 1, wherein the one or more booms are configured to provide sufficient drag to de-orbit a 15 kg satellite from a low Earth orbit in 25 years.

12. The AODCS of claim 1, further comprising one or more magnetorquers.

13. The AODCS of claim 12, wherein the one or more magnetorquers comprise five magnetorquers, four of the magnetorquers are disposed between adjacent deployers, and at least one of the magnetorquers is disposed in a plane that is generally parallel to back surface of the satellite body.

14. The AODCS of claim 12, wherein the one or more magnetorquers are configured to adjust the angular momentum of the satellite so that the satellite may efficiently exit a tumbling state and the one or more booms are not extended until the satellite exits the tumbling state.

15. The AODCS of claim 1, wherein a selectively retractable boom of the one or more selectively retractable booms has a flat width substantially equal to 4 cm.

16. A satellite comprising an attitude, orbit, and de-orbit control system (AODCS), the AODCS comprising:
    one or more selectively retractable booms, said one or more selectively retractable booms being collectively configured to provide a selectively adjustable drag during de-orbiting of a satellite over a predefined de-orbiting time; and
    a system controller configured to generate one or more instructions for causing retracting or extending of at least one of the one or more selectively retractable booms to control the drag on the satellite.

17. The satellite of claim 16, wherein the AODCS further comprises one or more magnetorquers.

18. The satellite of claim 17, wherein the one or more selectively retractable booms comprises four selectively retractable booms and the one or more magnetorquers comprises five magnetorquers.

19. An attitude, orbit, and de-orbit control system (AODCS) for a satellite, the system comprising: one or more selectively retractable booms, said one or more selectively retractable booms being collectively configured to provide a selectively adjustable drag during de-orbiting of a satellite over a predefined de-orbiting time; and
    one or more magnetorquers, wherein the one or more magnetorquers comprise five magnetorquers, four of the magnetorquers are disposed between adjacent deployers, and at least one of the magnetorquers is disposed in a plane that is generally parallel to back surface of the satellite body.

20. The AODCS of claim 19, further comprising at least one magnetometer.

* * * * *